(12) United States Patent
Qian et al.

(10) Patent No.: US 12,551,283 B2
(45) Date of Patent: Feb. 17, 2026

(54) SURGICAL NAVIGATION TRAJECTORY IN AUGMENTED REALITY DISPLAY

(71) Applicant: MediVis, Inc., New York, NY (US)

(72) Inventors: Long Qian, Watchung, NJ (US); Christopher Morley, New York, NY (US); Osamah Choudhry, New York, NY (US); Diego Salume, New York, NY (US)

(73) Assignee: Medivis, Inc., New York, NY (US)

( * ) Notice: Subject to any disclaimer, the term of this patent is extended or adjusted under 35 U.S.C. 154(b) by 292 days.

(21) Appl. No.: 18/208,136

(22) Filed: Jun. 9, 2023

(65) Prior Publication Data

US 2023/0320788 A1 Oct. 12, 2023

Related U.S. Application Data

(63) Continuation-in-part of application No. 17/961,423, filed on Oct. 6, 2022, now Pat. No. 11,992,934, and a continuation-in-part of application No. 17/871,885, filed on Jul. 22, 2022, now Pat. No. 11,744,652, and a continuation-in-part of application No. 17/502,030, filed on Oct. 14, 2021, now Pat. No. 12,127,800, and a continuation-in-part of application No. 17/489,693, filed on Sep. 29, 2021, now Pat. No. 11,931,114.

(51) Int. Cl.
*A61B 34/10* (2016.01)
*A61B 34/20* (2016.01)
*G06T 19/00* (2011.01)

(52) U.S. Cl.
CPC .............. *A61B 34/10* (2016.02); *A61B 34/20* (2016.02); *G06T 19/006* (2013.01); *A61B 2034/102* (2016.02); *A61B 2034/105* (2016.02); *A61B 2034/107* (2016.02)

(58) Field of Classification Search
None
See application file for complete search history.

(56) References Cited

U.S. PATENT DOCUMENTS 11,553,969 B1* 1/2023 Lang .................. G02B 27/0172
2020/0069373 A1* 3/2020 Yu .......................... A61B 34/10
2020/0383803 A1* 12/2020 Wu ...................... A61B 6/5217

* cited by examiner

*Primary Examiner* — Patricia J Park
(74) *Attorney, Agent, or Firm* — Cognition IP, P.C.; Edward Steakley; Rajesh Fotedar (57) ABSTRACT

Various embodiments of an apparatus, methods, systems and computer program products described herein are directed to a Trajectory Alignment Engine that generates within a unified three-dimensional (3D) coordinate space: (i) a 3D virtual medical model positioned according to a model pose, (ii) a virtual trajectory extending from a target point associated with a selected portion of the 3D virtual medical model and (iii) a dynamic navigation guide virtual object. The Trajectory Alignment Engine detects one or more changes in an instrument pose and/or an instrument position of a physical instrument in the 3D coordinate space. The Trajectory Alignment modifies the display of the dynamic navigation guide virtual object in the AR display at least in part on one or more of: the instrument pose changes and the instrument position changes.

16 Claims, 8 Drawing Sheets

SURGICAL NAVIGATION TRAJECTORY IN AUGMENTED REALITY DISPLAY

CROSS REFERENCE TO RELATED APPLICATIONS

This application is a continuation-in-part of U.S. patent application Ser. No. 17/489,693 entitled "Virtual Interaction with Instruments in Augmented Reality," filed on Sep. 29, 2021, the entirety of which is incorporated by reference.

This application is a continuation-in-part of U.S. patent application Ser. No. 17/871,885 entitled "Visualization of Predicted Dosage," filed on Jul. 22, 2022, the entirety of which is incorporated by reference.

This application is a continuation-in-part of U.S. patent application Ser. No. 17/961,423 entitled "Stereo View in Augmented Reality," filed on Oct. 6, 2022, the entirety of which is incorporated by reference.

This application is a continuation-in-part of U.S. patent application Ser. No. 17/502,030 entitled "Instrument-Based Registration and Alignment for Augmented Reality Environments," filed on Oct. 14, 2021, the entirety of which is incorporated by reference.

BACKGROUND

Current conventional systems have limitations with regard to two-dimensional (2D) and three-dimensional (3D) images in surgical settings. Surgical planning and surgical navigation are necessary for every medical procedure. A surgeon and their team must have a plan for a case before entering an operating room, not just as a matter of good practice but to minimize malpractice liabilities and to enhance patient outcomes. Surgical planning is often conducted based on medical images including DICOM scans (MRI, CT, etc.), requiring the surgeon to flip through numerous views/slices, and utilizing this information to imagine a 3D model of the patient so that the procedure may be planned. Accordingly, in such a scenario, the best course of action is often a surgeon's judgment call based on the data that they are provided.

SUMMARY

Various embodiments of an apparatus, methods, systems and computer program products described herein are directed to a Trajectory Alignment Engine. The Trajectory Alignment Engine provides significant improvements over the limitations of conventional systems. The Trajectory Alignment Engine generates within a unified three-dimensional (3D) coordinate space: (i) a 3D virtual medical model positioned according to a model pose, (ii) a virtual trajectory extending from a target point associated with a selected portion of the 3D virtual medical model and (iii) a dynamic navigation guide virtual object ("dynamic navigation guide"). The Trajectory Alignment Engine detects one or more changes in an instrument pose and/or an instrument position of a physical instrument in the 3D coordinate space. The Trajectory Alignment modifies the display of the dynamic navigation guide in the AR display at least in part on one or more of: the instrument pose changes and the instrument position changes.

According to various embodiments, the dynamic navigation guide may include a first component and a second component. The first component may be defined according to a shape. A size of the shape of the first component dynamically changes in response to detected movement of the physical instrument. The second component may be defined to move along an edge of the shape of the first component based on respective changes in the instrument pose of the physical instrument. In some embodiments, Trajectory Alignment Engine concurrently renders dynamic resizing of the first component and movement of the second component.

According to various embodiments, the Trajectory Alignment Engine tracks an extent of alignment of the physical instrument with the virtual trajectory that extends from the target point selected in the 3D virtual medical model.

According to various embodiments, the Trajectory Alignment Engine displays a visual cue upon detecting a position and orientation of the physical instrument satisfies a threshold alignment with the virtual trajectory.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1A:
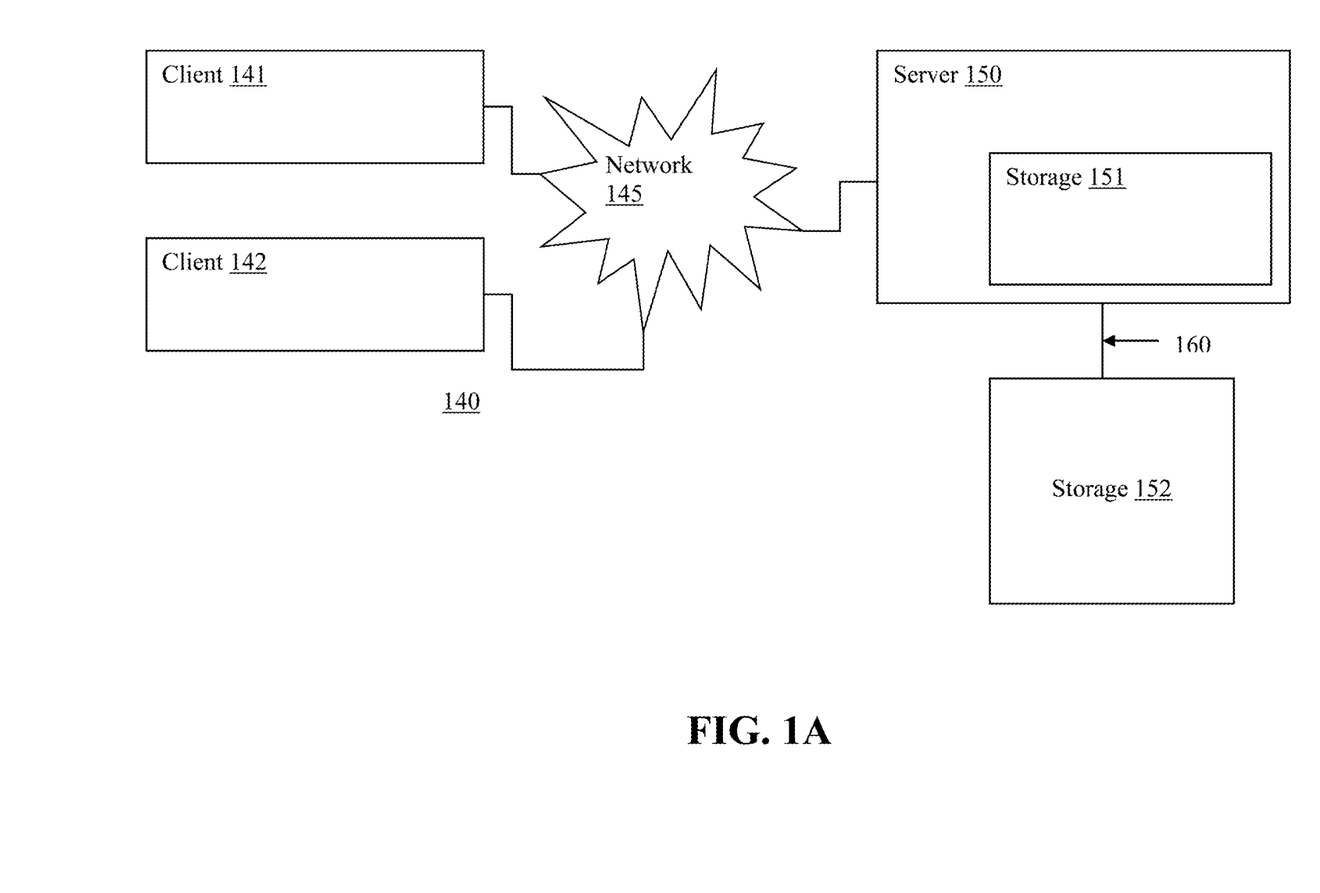
FIG. 1A is a diagram illustrating an exemplary environment in which some embodiments may operate.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

Figure 2:
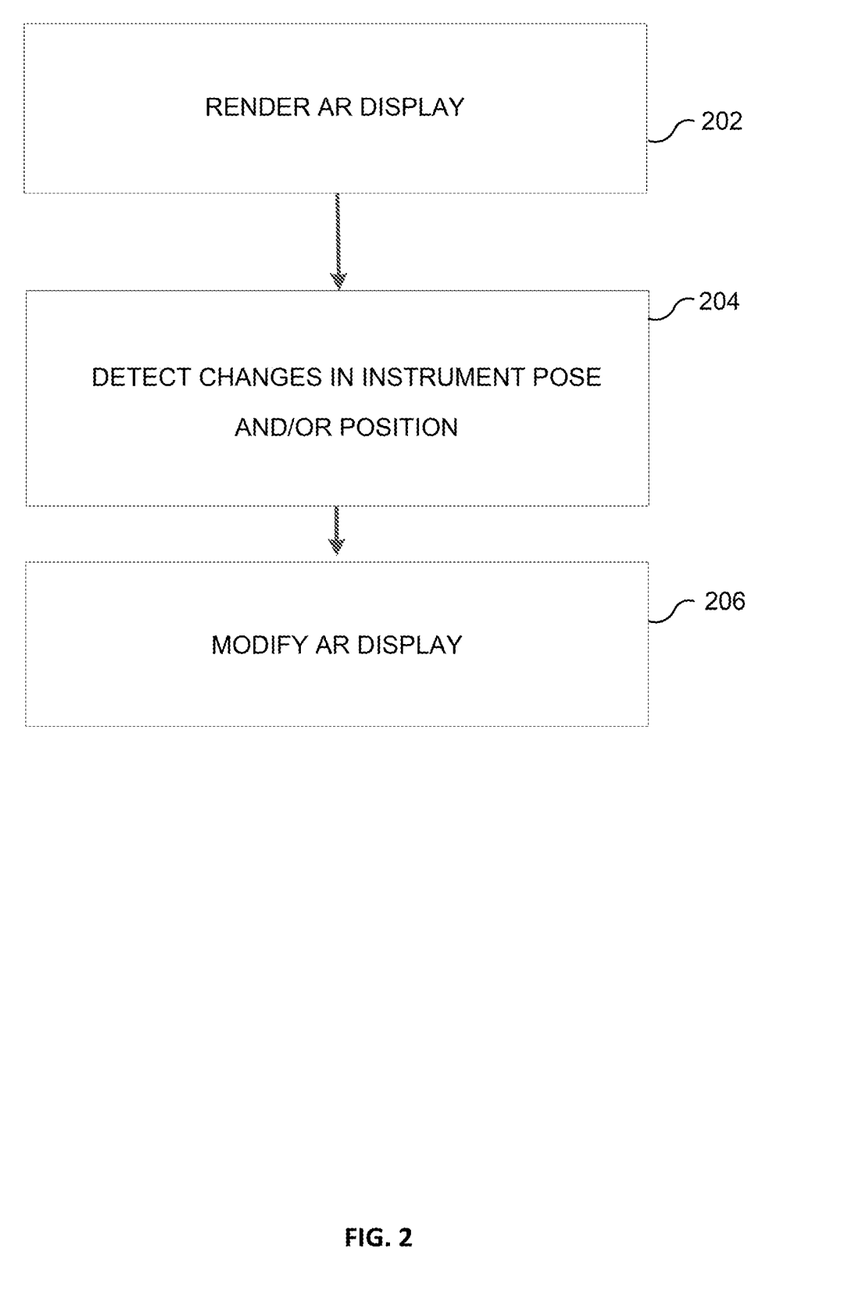
FIG. 2 is a diagram illustrating an exemplary method that may be performed in some embodiments.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
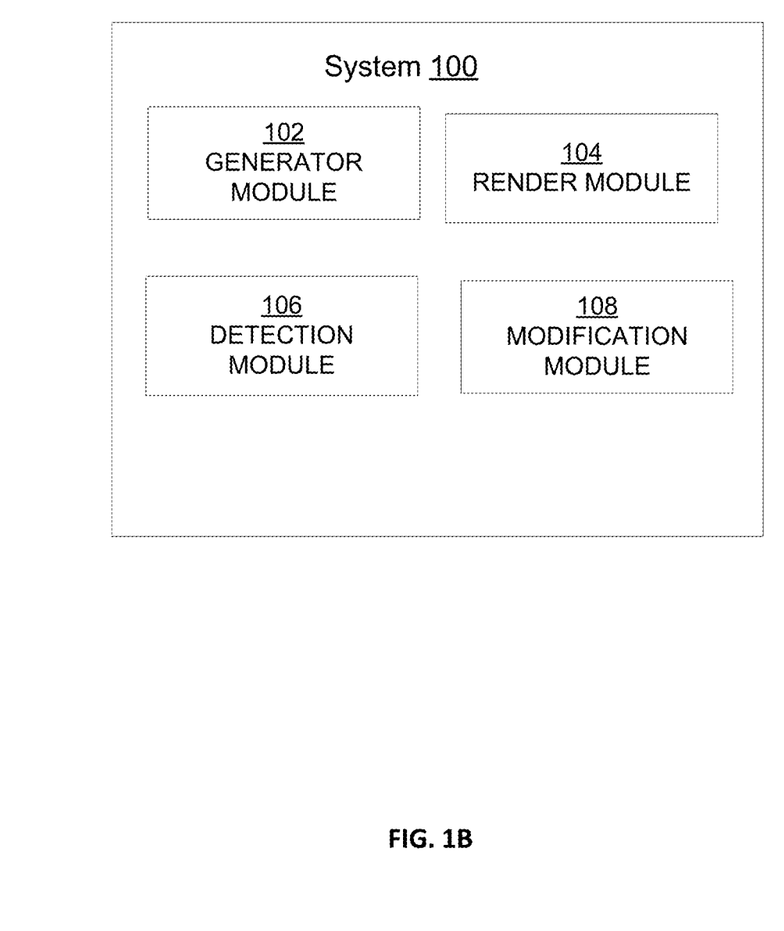
FIG. 1B is a diagram illustrating an exemplary environment in which some embodiments may operate.

FIG. 1B illustrates a block diagram of an example system 100 for a Trajectory Alignment Engine that includes one or more modules. The system 100 may communicate with a user device 140 to display output, via a user interface 144 generated by an application engine. In various embodiments, the user device 140 may be an AR display headset device that further includes one or more of the respective modules 102, 104, 106, 108.

A generator module 102 of the system 100 may perform functionality, steps, operations, commands and/or instructions as illustrated in one or more of FIGS. 2, 3, 4, 5 and 6 ("2-6"). The generator module 102 may generating within a unified three-dimensional (3D) coordinate space: a 3D virtual medical model positioned according to a model pose, a virtual trajectory extending from a target point associated with a selected portion of the 3D virtual medical model and a dynamic navigation guide virtual object ("dynamic navigation guide").

The render module 104 of the system 100 may perform functionality, steps, operations, commands and/or instructions as illustrated in one or more of FIGS. 2-6. The render module 104 may render an Augmented Reality (AR) display that includes concurrent display at least of the 3D virtual medical model, the target point, the virtual trajectory and the dynamic navigation guide;

The detection module 106 of the system 100 may perform functionality, steps, operations, commands and/or instructions as illustrated in one or more of FIGS. 2-6. The detection module 106 may detect one or more changes in an instrument pose and an instrument position of a physical instrument in the 3D coordinate space The modification module 108 of the system 100 may perform functionality, steps, operations, commands and/or instructions as illustrated in one or more of FIGS. 2-6. The modification module 108 may modify the display of the dynamic navigation guide in the AR display at least in part on one or more of: the instrument pose changes and the instrument position changes.

A database associated with the system 100 maintains information, such as 3D medical model data, in a manner the promotes retrieval and storage efficiency and/or data security. In addition, the model data may include rendering parameters, such as data based on selections and modifications to a 3D virtual representation of a medical model rendered for a previous Augmented Reality display. In various embodiments, one or more rendering parameters may be preloaded as a default value for a rendering parameter in a newly initiated session of the Trajectory Alignment Engine.

In various embodiments, the Trajectory Alignment Engine accesses one or more storage locations that contain respective portions of medical model data. The medical model data may be represented according to two-dimensional (2D) and three-dimensional (3D) medical model data. The 2D and/or 3D ("2D/3D") medical model data 124 may include a plurality of slice layers of medical data associated with external and internal anatomies. For example, the 2D/3D medical model data 124 may include a plurality of slice layers of medical data for generating renderings of external and internal anatomical regions of a user's head, brain and skull. It is understood that various embodiments may be directed to generating displays of any internal or external anatomical portions of the human body and/or animal bodies.

The Trajectory Alignment Engine renders the 3D virtual medical model in an AR display based on the 3D medical model data. In addition, the Trajectory Alignment Engine renders the 3D virtual medical model based on model pose data which describes an orientation and position of the rendering of the 3D virtual medical model. The Trajectory Alignment Engine applies the model pose data to the 3D medical model data to determine one or more positional coordinates in the unified 3D coordinate system for portion(s) of model data of a slice layer(s) that represent various anatomical locations.

The Trajectory Alignment Engine further renders the 3D virtual medical model based on a current device pose of an AR headset device worn by the user. The current device pose represents a current position and orientation of the AR headset device in the physical world. The Trajectory Alignment Engine translates the current device pose to a position and orientation within the unified 3D coordinate system to determine the user's perspective view of the AR display. The Trajectory Alignment Engine generates a rendering of the 3D virtual medical model according to the model pose data for display to the user in the AR display according to the user's perspective view. Similarly, the Trajectory Alignment Engine generates instrument pose data based on a current pose of a physical instrument. The current instrument pose represents a current position and orientation of a physical instrument in the physical world. For example, the physical instrument may be held by a user's hands and may have one or more fiducial markers. The Trajectory Alignment Engine translates the current instrument pose to a position and orientation within the unified 3D coordinate system to determine the physical instrument's display position and orientation in the AR display and/or placement with respect to one or more virtual objects. It is understood that the Trajectory Alignment Engine continually updates the instrument pose data to represent subsequent changes in the position and orientation of the physical instrument.

Various embodiments described herein provide functionality for selection of menu functionalities and positional display coordinates. For example, the Trajectory Alignment Engine tracks one or more physical gestures such as movement of a user's hand(s) and/or movement of a physical instrument(s) via one or more tracking algorithms to determine directional data to further be utilized in determining whether one or more performed physical gestures indicate a selection of one or more types of functionalities accessible via the AR display and/or selection and execution of a virtual interaction(s). For example, the Trajectory Alignment Engine may track movement of the user's hand that results in movement of a physical instrument and/or one or more virtual offsets and virtual objects associated with the physical instrument. The Trajectory Alignment Engine may determine respective positions and changing positions of one or more hand joints or one or more portions of the physical instrument. In various embodiments, the Trajectory Alignment Engine may implement a simultaneous localization and mapping (SLAM) algorithm.

The Trajectory Alignment Engine may generate directional data based at least in part on average distances between the user's palm and the user's fingers and/or hand joints or distances between portions (physical portions and/or virtual portions) of a physical instrument. In some embodiments, the Trajectory Alignment Engine generates directional data based on detected directional movement of the AR headset device worn by the user. The Trajectory Alignment Engine determines that the directional data is based on a position and orientation of the user's hand(s) (or the physical instrument) that indicates a portion(s) of a 3D virtual object with which the user seeks to select and/or virtually interact with and/or manipulate.

According to various embodiments, the Trajectory Alignment Engine may implement a collision algorithm to determine a portion of a virtual object the user seeks to select and/or virtually interact with. For example, the Trajectory Alignment Engine may track the user's hands and/or the physical instrument according to respective positional coordinates in the unified 3D coordinate system that correspond to the orientation of the user's hands and/or the physical instrument in the physical world. The Trajectory Alignment Engine may detect that one or more tracked positional coordinates may overlap (or be the same as) one or more positional coordinates for displaying a particular portion(s) of a virtual object. In response to detecting the overlap (or intersection), the Trajectory Alignment Engine determines that the user seeks to select and/or virtually interact with the portion(s) of the particular virtual object displayed at the overlapping positional coordinates.

According to various embodiments, upon determining the user seeks to select and/or virtually interact with a virtual object, the Trajectory Alignment Engine may detect one or more changes in hand joint positions and/or physical instrument positions and identify the occurrence of the position changes as a performed selection function. For example, a performed selection function may represent an input command to the Trajectory Alignment Engine confirming the user is selecting a portion of a virtual object via a ray casting algorithm and/or collision algorithm. For example, the performed selection function may also represent an input command to the Trajectory Alignment Engine confirming the user is selecting a particular type of virtual interaction functionality. For example, the user may perform a physical gesture of tips of two fingers touching to correspond to a virtual interaction representing an input command, such as a select input command.

The Trajectory Alignment Engine identifies one or more virtual interactions associated with the detected physical gestures. In various embodiments, the Trajectory Alignment Engine identifies a virtual interaction selected by the user, or to be performed by the user, based on selection of one or more functionalities from a 3D virtual menu displayed in the AR display. In addition, the Trajectory Alignment Engine identifies a virtual interaction selected by the user according to one or more pre-defined gestures that represent input commands for the Trajectory Alignment Engine. In some embodiments, a particular virtual interaction may be identified based on a sequence of performed physical gestures detected by the Trajectory Alignment Engine. In some embodiments, a particular virtual interaction may be identified as being selected by the user based on a series of preceding virtual interactions.

As shown in the flowchart 200 of FIG. 2, at step 202, the Trajectory Alignment Engine renders an Augmented Reality (AR) display that includes concurrent display of a 3D virtual medical model, a target point, a virtual trajectory and a dynamic navigation guide proximate to the virtual trajectory. In various embodiments, a first component of the dynamic navigation guide may be defined according to a shape. The size of the shape of the first component may be defined to change according to respective changes in a distance from a current position of the physical instrument to the target point. A second component of the dynamic navigation guide may be defined to move along an edge of the shape of the first component based on respective changes in the instrument pose of the physical instrument. In some embodiments, the dynamic navigation guide may be a circle aim virtual object. It is understood that the dynamic navigation guide may be defined according to any shape or combination of shapes and is not limited to a circle shape.

At step 204, the Trajectory Alignment Engine detects one or more changes in an instrument pose and/or an instrument position of a physical instrument in the 3D coordinate space. At step 206, the Trajectory Alignment Engine modifies the display of the dynamic navigation guide in the AR display at least in part on one or more of: the instrument pose changes and the instrument position changes.

According to various embodiments, the Trajectory Alignment Engine adjusts the visual appearance of the dynamic navigation guide in the AR display based on movement of a physical instrument. The movement of the physical instrument may change the position and orientation of the physical instrument in the in the 3D coordinate space. The Trajectory Alignment Engine modifies the visual appearance of the dynamic navigation guide based on a relationship between the movement of the physical instrument and a location of the target point in the 3D virtual medical model and/or a relationship between the movement of the physical instrument an orientation of the virtual trajectory in the in the 3D coordinate space.

According to various embodiments, the dynamic navigation guide may be a circle aim virtual object ("circle aim"). Trajectory Alignment Engine generates the circle aim according to a circle virtual object ("circle") and a circle aim target virtual object ("circle aim target"). The circle may have a dynamic circumference that increases and decreases in relation to the distance between a current position of the physical instrument and the target point selected in the 3D virtual medical model.

According to various embodiments, the Trajectory Alignment Engine generates the circle aim target as a visual indicator that travels along the circle of the circle aim as the dynamic circumference expands and decreases. The direction at which the circle aim target travels on the circle corresponds to a current position and physical orientation of the physical instrument caused by detected movement of the physical instrument.

Figure 3:
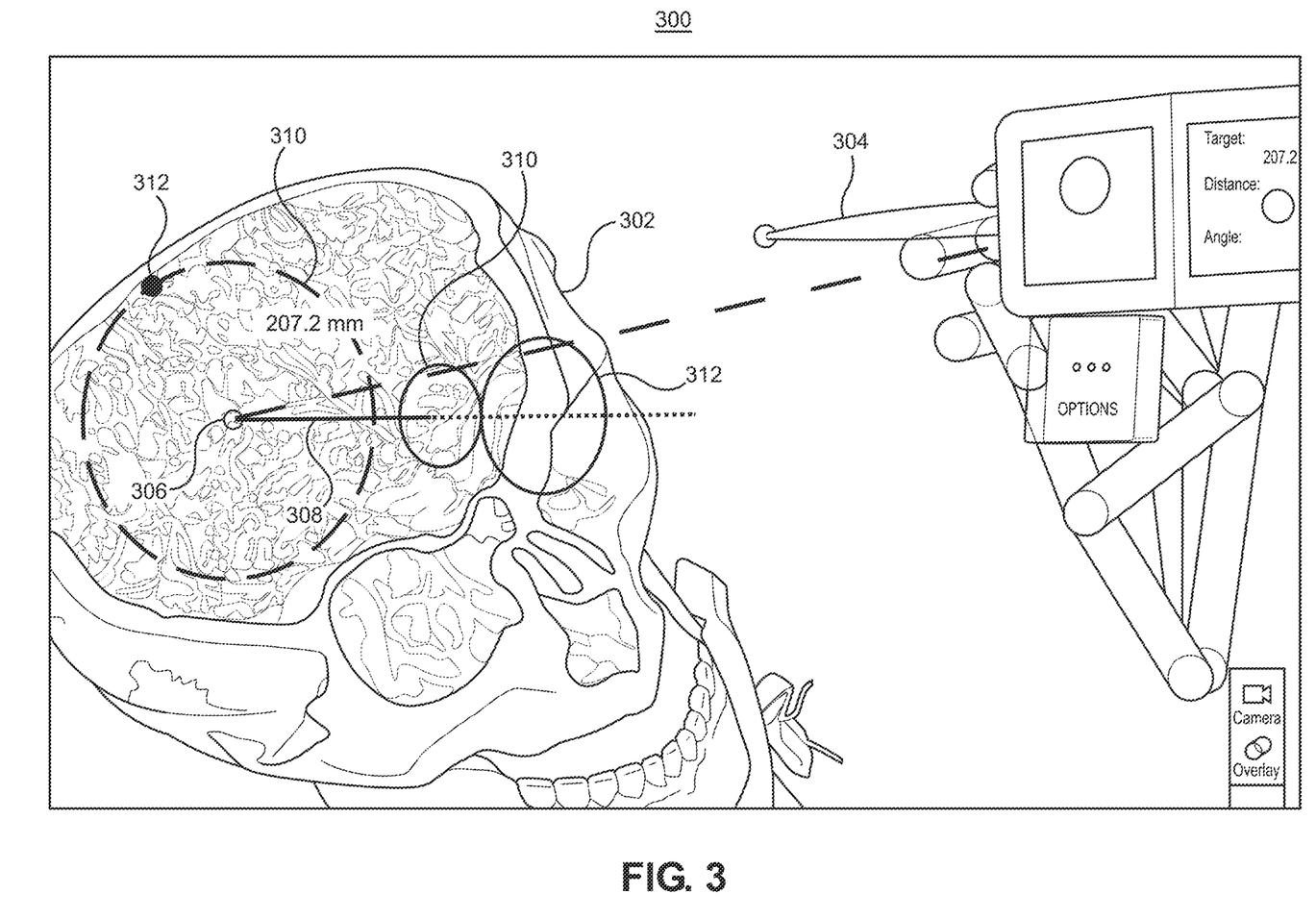
FIG. 3 is a diagram illustrating an exemplary environment in which some embodiments may operate.

As shown in FIG. 3, the Trajectory Alignment Engine generates and renders an AR display 300 that include display of a 3D virtual medical model 302, a virtual representation of a physical instrument 304 and the dynamic navigation guide as a circle aim 310. Display of the 3D virtual medical model 302 includes display of a selected target point 306. For example, the target point 306 may be a selected portion of the 3D virtual medical model 302 that represents a physical anatomical feature that has been identified as location for surgical intervention or a location for receipt of medical treatment. The virtual representation of the physical instrument 304 may include display of one or more virtual overlays.

In various embodiments, a virtual trajectory 308 extends from the target point 306 through the 3D virtual medical model 302 such that the Trajectory Alignment Engine renders the virtual trajectory 308 as passing through an entry point on the 3D virtual medical model 302. For example, the entry point may be a selected portion of the 3D virtual medical model 302 that represents a physical anatomical feature that has been identified as a location on a surface of an anatomical region. In some embodiments, display of the virtual trajectory 308 may include a solid line portion and a dashed line portion. In one or more embodiments, display of the virtual trajectory 308 may include display of one or more guide rings 314, 316 that encircle the virtual trajectory 308.

According to various embodiments, the Trajectory Alignment Engine may render the circle aim 310 with a first and second component. The first component of the circle aim 310 may be a dashed circle that surrounds the target point 306. In some embodiments, Trajectory Alignment Engine generates the dashed circle of the circle aim 310 according to a dynamic circumference that corresponds to respective changes in the current distance from a current position of the physical instrument to the target point 306. The second component of the circle aim 310 may be a circle aim target 312 that travels along the dashed circle of the circle aim 310. The Trajectory Alignment Engine generates the circle aim target 312 according to a display position that moves along the dashed circle based on respective changes in the instrument pose of the physical instrument.

Figure 4:
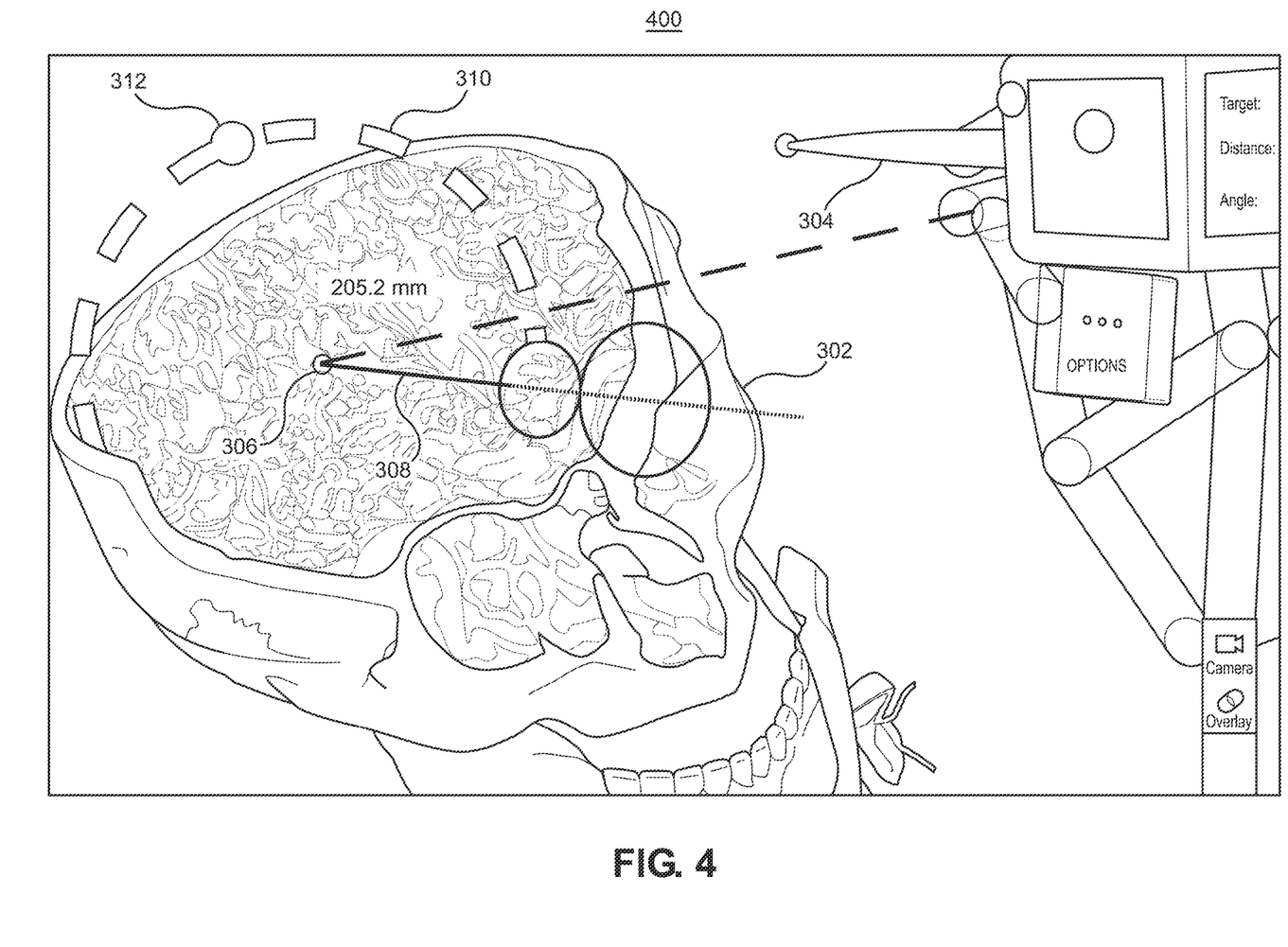
FIG. 4 is a diagram illustrating an exemplary environment in which some embodiments may operate.

As shown in FIG. 4, the Trajectory Alignment Engine detects movement of the physical instrument that is represented by the virtual representation of the physical instrument 304. For example, the detected movement results in the moving the physical instrument such that the instrument's position results in a decrease of the distance between the physical instrument to the target point 306. Based on detecting the physical instrument moving towards the target point 306, the Trajectory Alignment Engine decreases the dynamic circumference of the circle aim 310 and displays the circle aim 310 in the AR display 400 according to the updated (or decreased) circumference.

In some embodiments, the Trajectory Alignment Engine renders a display of circle aim 310 gradually decreasing in circumference while detecting the movement of the physical instrument. The Trajectory Alignment Engine determines the circumference of the circle aim 310 based on a current distance from a first position of the physical instrument to the target point 306. The Trajectory Alignment Engine may detect movement of the physical instrument from the first position to a second position. The Trajectory Alignment Engine detects a second distance to the target point 306 due to the detected movement of the physical instrument from the first position to a second position. The Trajectory Alignment Engine determines a second circumference of the circle aim 310 based on the second distance. For example, the second circumference may be less than the first circumference if the detected movement indicates the physical instrument moving towards the target point 306. In another example, the second circumference may be greater than the first circumference if the detected movement indicates the physical instrument moving away from the target point 306.

The Trajectory Alignment Engine maintains display of the circle aim target 312 on the circle aim 310 by determining a display position of the based on a radius of the circle aim target 312 displayed according to the decreased circumference. For example, the radius may extend from the target point 306 to the display position of the circle aim target 312.

Figure 5:
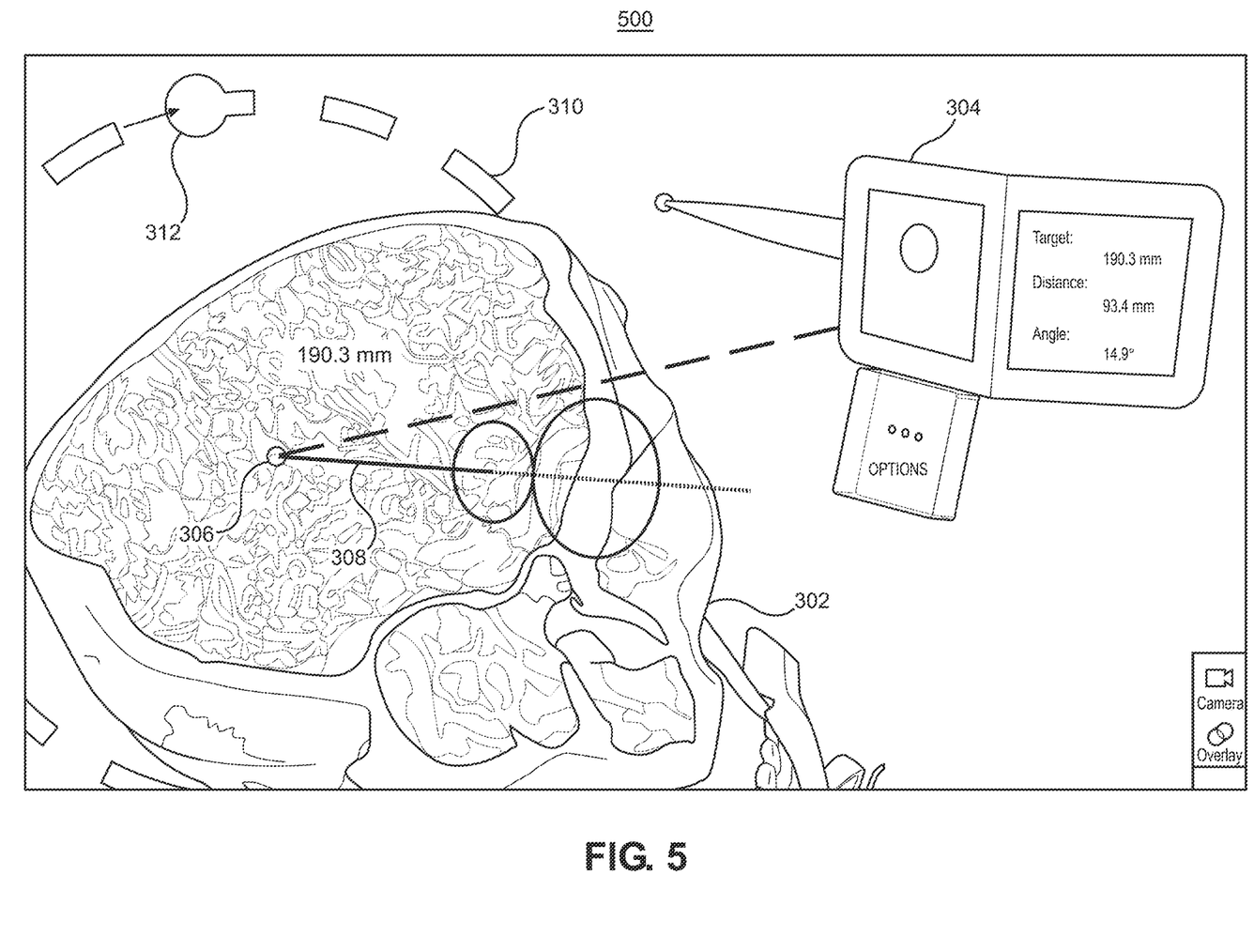
FIG. 5 is a diagram illustrating an exemplary environment in which some embodiments may operate.

As shown in FIG. 5, the Trajectory Alignment Engine detects movement of the physical instrument that is represented by the virtual representation of the physical instrument 304. For example, the detected movement results in the moving the physical instrument such that the instrument's position results in an increase of the distance between the physical instrument to the target point 306. Based on detecting the physical instrument moving away from the target point 306, the Trajectory Alignment Engine increases the dynamic circumference of the circle aim 310 and displays the circle aim 310 in the AR display 500 according to the updated (or increased) circumference. The Trajectory Alignment Engine maintains display of the circle aim target 312 on the circle aim 310 by determining a display position of the based on a radius of the circle aim target 312 displayed according to the increased circumference.

In some embodiments, the Trajectory Alignment Engine determines the display position of the circle aim target 312 according to one or more changes in the instrument pose. The Trajectory Alignment Engine Detected further determines an extent of alignment between the physical instrument and the virtual trajectory 308 due to one or more changes in the instrument pose. For example, based on a change(s) of the instrument pose, the Trajectory Alignment Engine renders the circle aim target 312 as traveling in a rightward direction along the circle aim 310.

It is understood that, in various embodiments, the Trajectory Alignment Engine may display the circle aim target 312 traveling along the circle aim 310 as the Trajectory Alignment Engine displays the circle aim 310 according to varying dynamic circumferences. For example, the Trajectory Alignment Engine may render the circle aim target 312 as traveling along the circle aim while the Trajectory Alignment Engine renders the circle aim 310 as increasing or decreasing in circumference.

Figure 6:
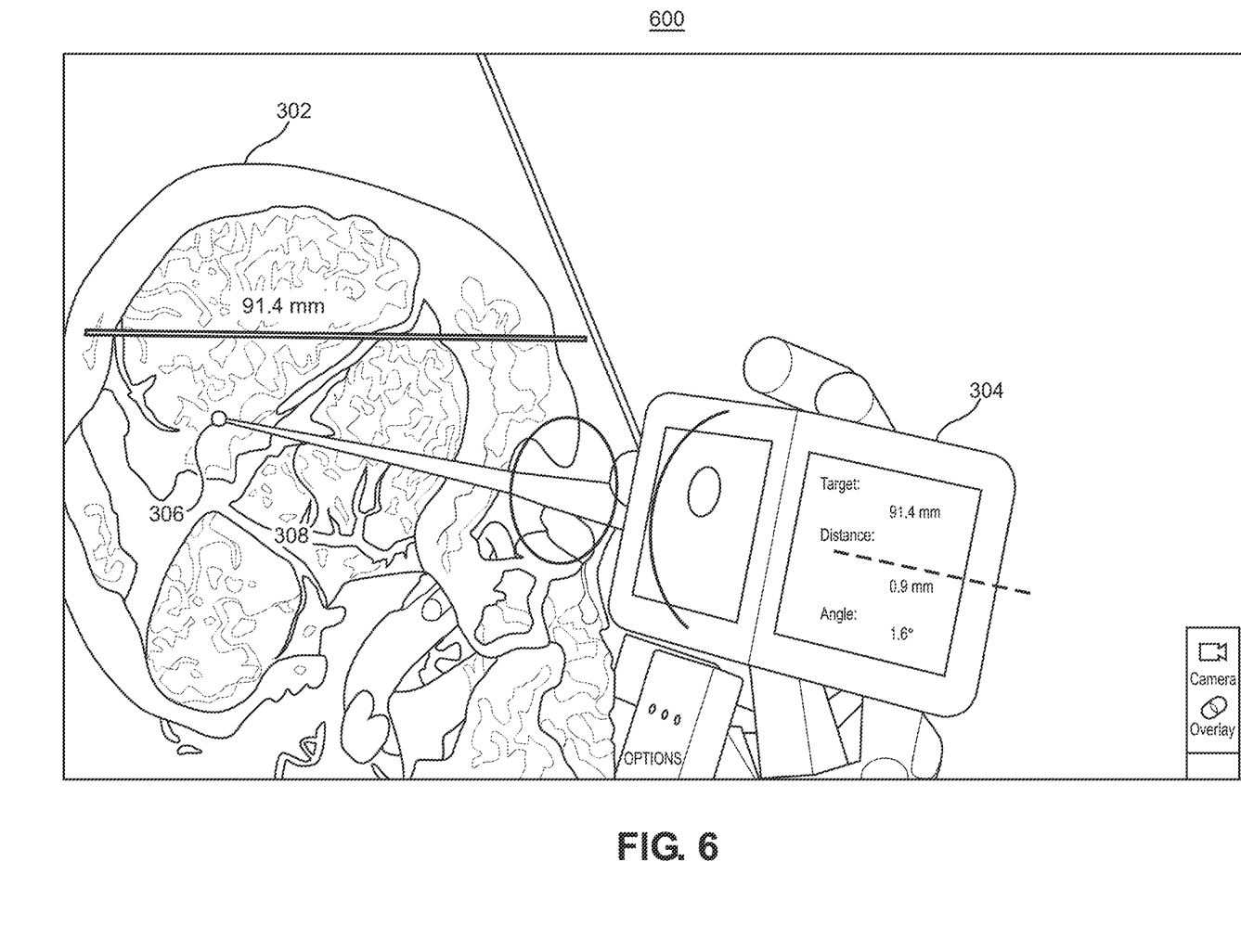
FIG. 6 is a diagram illustrating an exemplary environment in which some embodiments may operate.

As shown in FIG. 6, the Trajectory Alignment Engine triggers a visual cue upon detecting that at least a portion of the virtual representation of the physical instrument 304 is in alignment with the virtual trajectory 308. For example, a virtual offset may extend from the virtual representation of the physical instrument 304 and detection of alignment with the virtual trajectory 308 may be based on alignment of the virtual offset with the virtual trajectory 308. In some embodiments, the visual cue indicating alignment may be a color change. For example, multiple virtual objects currently displayed in the AR display 600 may change color. The multiple virtual objects may each change to the same color. In some embodiments, the multiple virtual objects may each concurrently change to the same color. In other embodiments, the visual cue may be a modification of an appearance of one or more of the multiple virtual object currently displayed in AR display 600.

In some embodiments, alignment may be detected by the Trajectory Alignment Engine based on a current orientation of the physical instrument matching the orientation of the virtual trajectory 308. For example, the Trajectory Alignment Engine may determines that one or more portions of the virtual representation of the physical instrument 304 map to position coordinates that overlap with positional coordinates of the virtual trajectory 308. In addition, the Trajectory Alignment Engine may implement a proximity range defining an allowable distance between one or more portions of the virtual representation of the physical instrument 304 and one or more portions of the virtual trajectory 308. The Trajectory Alignment Engine determines that alignment occurs when the one or more portions of the virtual representation of the physical instrument 304 stay within the proximity range for an entirety of a predefined amount of time.

Selection of Target Point and Entry Point via Virtual Offset

Various embodiments of the Trajectory Alignment Engine may be based at least in part on one or more embodiments described in U.S. patent application Ser. No. 17/489,693. The Trajectory Alignment Engine provides functionality for an offset tip virtual interaction with respect to the physical instrument. The Trajectory Alignment Engine may display a virtual object comprising a virtual offset of the physical instrument. For example, the virtual offset may be displayed as a line extending from the tip of the physical instrument (or the virtual representation of the physical instrument) to a display position of a virtual object comprising the virtual offset tip.

The Trajectory Alignment Engine modifies the AR display by generating display of a virtual extension of the physical instrument from the tip position of the physical instrument (or virtual representation of the physical instrument) to the virtual offset tip position. It is understood that the virtual offset tip and a virtual offset are virtual objects.

According to various embodiments, the Trajectory Alignment Engine identifies selection of a target point of a virtual trajectory by a virtual offset displayed as an extension of the virtual representation of the physical instrument. For example, the Trajectory Alignment Engine tracks a physical gesture(s) with respect to the physical instrument that places the virtual offset tip at coordinates of a display position within a currently displayed 3D virtual medical model. The selected target point thereby corresponds to a portion of the 3D virtual medical model. For example, the target point may be a display position with particular coordinates that reference a particular internal anatomical location represented by the 3D virtual medical model.

The Trajectory Alignment Engine may determine selection of a target point based on detection a period of dwelling time of the virtual offset tip proximate to or at particular coordinates the 3D virtual medical model. For example, the Trajectory Alignment Engine detects that a current position(s) of the virtual offset tip is within a range of proximity to a particular coordinate(s) that reference an anatomical location represented by the 3D virtual medical model. The Trajectory Alignment Engine further determines whether the virtual offset tip stays (or dwells) within that range of proximity to the particular coordinates for a predetermined period of time. Upon determining that the predetermined period of time has lapsed and that the virtual offset tip has dwelled within that range of proximity to the particular coordinates during the entirety of the predetermined period of time, the Trajectory Alignment Engine identifies dwelling of the virtual offset tip as a virtual interaction representing selection of the particular coordinates as a target point. The Trajectory Alignment Engine may determine selection of an entry point similar to selection of the target point.

In various embodiments, the Trajectory Alignment Engine may determine concurrent selection of the target point and the entry point. Upon determining the dwelling of the virtual offset tip and identifying the particular coordinates as the target point, the Trajectory Alignment Engine concurrently identifies a second set of coordinates that collide with a portion of the virtual offset. The second set of coordinates reference another anatomical location represented by the 3D virtual medical model. For example, the second set of coordinates may reference an anatomical surface location where a surgical instrument will initially make physical contact with a patient's anatomy while traveling along a trajectory planned according to the virtual trajectory.

The Trajectory Alignment Engine identifies collision (or overlap) of the portion of the virtual offset with the second set of coordinates—caused by the dwelling to select the target point—as a virtual interaction representing selection of the second set of coordinates as an entry point. Upon determining selection of both the target point and the entry point, the Trajectory Alignment Engine determines an orientation of the virtual trajectory based at least on a current pose of the physical instrument during the dwelling to select the target point ("instrument's dwelling pose"). The Trajectory Alignment Engine generates the virtual trajectory to extend from the target point and through the entry point at an orientation based on the instrument's dwelling pose.

Figure 7:
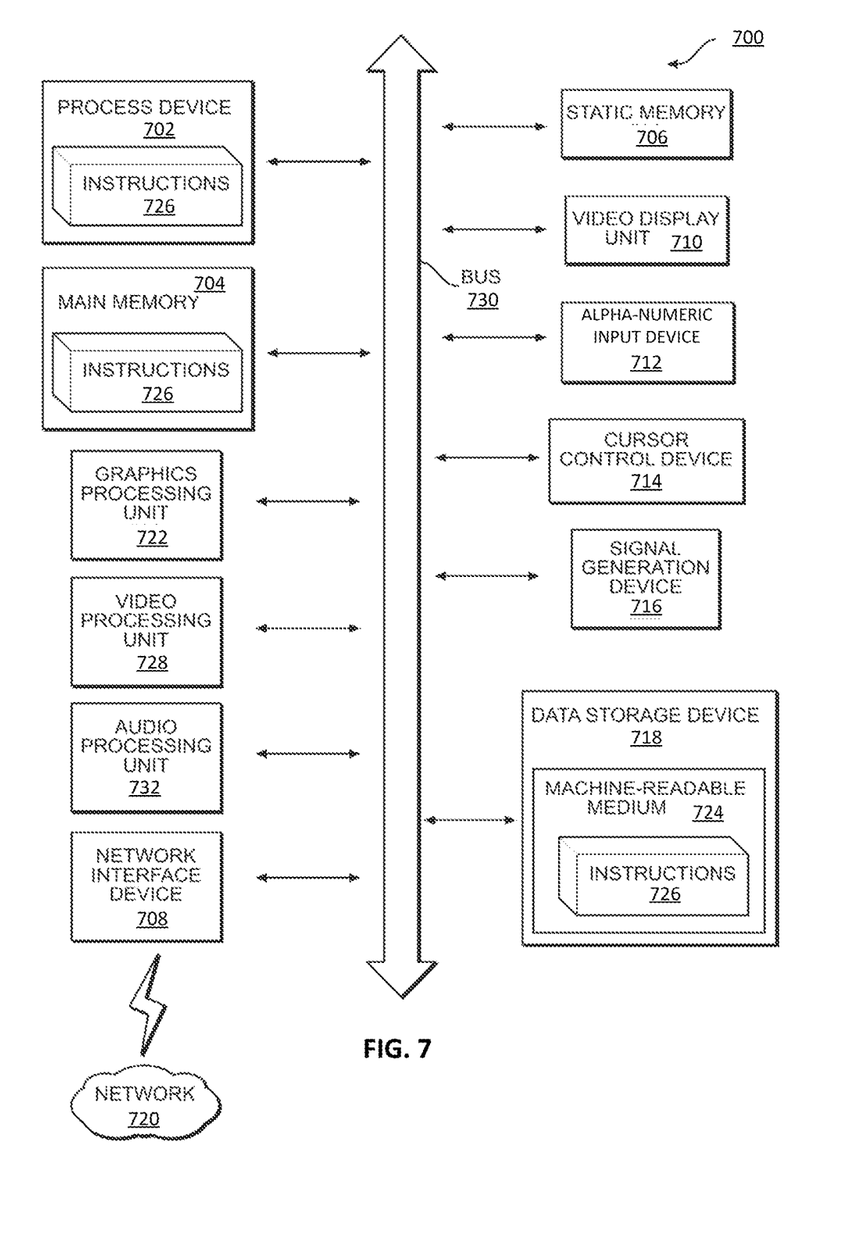
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
   generating within a unified three-dimensional (3D) coordinate space:
   (i) a 3D virtual medical model positioned according to a model pose;
   (ii) a virtual trajectory extending from a target point associated with a selected portion of the 3D virtual medical model;
   (iii) a dynamic navigation guide virtual object comprising a circle aim virtual object ("circle") having a component comprising a circle aim target virtual object ("circle aim target");
   rendering an Augmented Reality (AR) display that includes concurrent display at least of the 3D virtual medical model, the target point, the virtual trajectory and the circle;
   detecting one or more changes in an instrument pose and an instrument position of a physical instrument in the 3D coordinate space; and
   modifying the display of the dynamic navigation guide in the AR display at least in part on one or more of: the instrument pose changes and the instrument position changes, further comprising:
   rendering the circle according to dynamic changes in a circumference that corresponds to respective changes of a distance between a current position of the physical instrument to the target point caused by detected movement of the physical instrument; and
   concurrent with rendering the dynamic changes in the circle's circumference:
     rendering the circle aim target as moving along the circle based on (i) the respective changes in the instrument pose of the physical instrument and (ii) an extent of an alignment of the respective changes in the instrument pose with an orientation of the virtual trajectory in the 3D coordinate space.

2. The computer-implemented method of claim 1 wherein modifying the display of the circle aim in the AR display comprises:
   displaying updated versions of the circle according to the dynamic circumference varying based on changes to the current position of the physical instrument due to detected movement of the physical instrument; and
   displaying the circle aim target move along the circle concurrent with display of the updated versions of the circle according to respective varying dynamic circumferences.

3. The computer-implemented method of claim 2, wherein displaying the circle aim target move along the circle comprises: determining a first display position of the circle aim target based on a radius of a circumference of a first version of the circle; and determining a second display position of the circle aim target based on a radius of circumference of a second version of the circle, wherein the circumferences of the first and second versions of the circle comprise different circumferences.

4. The computer-implemented method of claim 2, wherein generating the circle comprises: determining a first circumference of the circle based on a first distance from a first position of the physical instrument to the selected target point; detecting a second distance to the selected target point resulting at least in part from the detected movement of the physical instrument from the first position to a second position; and determining a second circumference of the circle abased on the second distance from the second position of the physical instrument to the selected target point.

5. The computer-implemented method of claim 2, wherein generating the circle aim target comprises:
   determining a first display position of the circle aim target on the circle that corresponds with a first instrument pose of the physical instrument in the 3D coordinate space;
   and determining a second display position of the circle aim target on the circle that corresponds with a change from the first instrument pose to a second instrument pose of the physical instrument.

6. The computer-implemented method of claim 5, further comprising:
   determining the first display position of the circle aim target on the circle according to a first extent of alignment of the first instrument pose with the virtual trajectory; and
   determining the second display position of the circle aim target on the circle according to a second extent of alignment of the second instrument pose with the virtual trajectory, the first extent of alignment being different than the second extent of alignment.

7. A system comprising one or more processors, and a non-transitory computer-readable medium including one or more sequences of instructions that, when executed by the one or more processors, cause the system to perform operations comprising:
   generating within a unified three-dimensional (3D) coordinate space:
   (i) a 3D virtual medical model positioned according to a model pose;
   (ii) a virtual trajectory extending from a target point associated with a selected portion of the 3D virtual medical model;
   (iii) a dynamic navigation guide virtual object comprising a circle aim virtual object ("circle") having a component comprising a circle aim target virtual object ("circle aim target");
   rendering an Augmented Reality (AR) display that includes concurrent display at least of the 3D virtual medical model, the target point, the virtual trajectory and the circle;

detecting one or more changes in an instrument pose and an instrument position of a physical instrument in the 3D coordinate space; and modifying the display of the dynamic navigation guide in the AR display at least in part on one or more of: the instrument pose changes and the instrument position changes, further comprising:

rendering the circle according to dynamic changes in a circumference that corresponds to respective changes of a distance between a current position of the physical instrument to the target point caused by detected movement of the physical instrument; and concurrent with rendering the dynamic changes in the circle's circumference:

rendering the circle aim target as moving along the circle based on (i) the respective changes in the instrument pose of the physical instrument and (ii) an extent of an alignment of the respective changes in the instrument pose with an orientation of the virtual trajectory in the 3D coordinate space.

8. The system of claim 7,
wherein modifying the display of the circle aim in the AR display comprises:

displaying updated versions of the circle according to the dynamic circumference varying based on changes to the current position of the physical instrument due to detected movement of the physical instrument; and displaying the circle aim target move along the circle concurrent with display of the updated versions of the circle according to respective varying dynamic circumferences.

9. The system of claim 8, wherein displaying the circle aim target move along the circle comprises:

determining a first display position of the circle aim target based on a radius of a circumference of a first version of the circle; and determining a second display position of the circle aim target based on a radius of circumference of a second version of the circle, wherein the circumferences of the first and second versions of the circle comprise different circumferences.

10. The system of claim 8, wherein generating the circle comprises:

determining a first circumference of the circle based on a first distance from a first position of the physical instrument to the selected target point;

detecting a second distance to the selected target point resulting at least in part from the detected movement of the physical instrument from the first position to a second position; and determining a second circumference of the circle based on the second distance from the second position of the physical instrument to the selected target point.

11. The system of claim 8, wherein generating the circle aim target comprises:

determining a first display position of the circle aim target on the circle that corresponds with a first instrument pose of the physical instrument in the 3D coordinate space; and determining a second display position of the circle aim target on the circle that corresponds with a change from the first instrument pose to a second instrument pose of the physical instrument.

12. The system of claim 8, further comprising:
determining the first display position of the circle aim target on the circle according to a first extent of alignment of the first instrument pose with the virtual trajectory; and determining the second display position of the circle aim target on the circle according to a second extent of alignment of the second instrument pose with the virtual trajectory, the first extent of alignment being different than the second extent of alignment.

13. A computer program product comprising a non-transitory computer-readable medium having a computer-readable program code embodied therein to be executed by one or more processors, the program code including instructions to:

generating within a unified three-dimensional (3D) coordinate space:

(i) a 3D virtual medical model positioned according to a model pose;

(ii) a virtual trajectory extending from a target point associated with a selected portion of the 3D virtual medical model;

(iii) a dynamic navigation guide virtual object comprising a circle aim virtual object ("circle") having a component comprising a circle aim target virtual object ("circle aim target");

rendering an Augmented Reality (AR) display that includes concurrent display at least of the 3D virtual medical model, the target point, the virtual trajectory and the circle;

detecting one or more changes in an instrument pose and an instrument position of a physical instrument in the 3D coordinate space; and modifying the display of the dynamic navigation guide in the AR display at least in part on one or more of: the instrument pose changes and the instrument position changes, further comprising:

rendering the circle according to dynamic changes in a circumference that corresponds to respective changes of a distance between a current position of the physical instrument to the target point caused by detected movement of the physical instrument; and concurrent with rendering the dynamic changes in the circle's circumference:

rendering the circle aim target as moving along the circle based on (i) the respective changes in the instrument pose of the physical instrument and (ii) an extent of an alignment of the respective changes in the instrument pose with an orientation of the virtual trajectory in the 3D coordinate space.

14. The computer program product of claim 13,
wherein modifying the display of the circle aim in the AR display comprises:

displaying updated versions of the circle according to the dynamic circumference varying based on changes to the current position of the physical instrument due to detected movement of the physical instrument; and displaying the circle aim target move along the circle concurrent with display of the updated versions of the circle according to respective varying dynamic circumferences.

15. The computer program product of claim 14, wherein displaying the circle aim target move along the circle comprises:

determining a first display position of the circle aim target based on a radius of a circumference of a first version of the circle; and determining a second display position of the circle aim target based on a radius of circumference of a second version of the circle, wherein the circumferences of the first and second versions of the circle comprise different circumferences.

16. The computer program product of claim 14, wherein generating the circle comprises:

determining a first circumference of the circle based on a first distance from a first position of the physical instrument to the selected target point;

detecting a second distance to the selected target point resulting at least in part from the detected movement of the physical instrument from the first position to a second position; and     determining a second circumference of the circle based on the second distance from the second position of the physical instrument to the selected target point;

wherein generating the circle aim target comprises:

determining a first display position of the circle aim target on the circle that corresponds with a first extent of alignment, with the virtual trajectory, of a first instrument pose of the physical instrument in the 3D coordinate space; and     determining a second display position of the circle aim target on the circle that corresponds with a change from the first extent of alignment to second extent of alignment due to a change of the first instrument pose to a second instrument pose of the physical instrument.

\* \* \* \* \*